(12) United States Patent
Colombot

(10) Patent No.: US 6,601,243 B2
(45) Date of Patent: Aug. 5, 2003

(54) TOILET INSTALLATION IMPLEMENTING COMPOSTING WITH WORMS

(75) Inventor: Pierre Colombot, Saint Ferreol Trente Pas (FR)

(73) Assignee: Ecosphere Technologies, Saint Ferreol Trente Pas (FR)

( * ) Notice: Subject to any disclaimer, the term of this patent is extended or adjusted under 35 U.S.C. 154(b) by 39 days.

(21) Appl. No.: 10/109,839

(22) Filed: Apr. 1, 2002

(65) Prior Publication Data

US 2002/0144339 A1 Oct. 10, 2002

(30) Foreign Application Priority Data

Apr. 6, 2001 (FR) .............................. 01 04688

(51) Int. Cl.⁷ .............................................. A47K 11/02
(52) U.S. Cl. .................... 4/449; 4/DIG. 12; 435/290.2; 435/290 A
(58) Field of Search ........................... 4/449, DIG. 12; 435/290.1, 290.2, 290.4; 71/8, 9

(56) References Cited

U.S. PATENT DOCUMENTS

| | | | |
|---|---|---|---|
| 3,136,608 A | * 6/1964 | Lindstrom | 4/DIG. 12 |
| 4,084,269 A | * 4/1978 | Lindstrom | 4/DIG. 12 |
| 5,192,428 A | * 3/1993 | Lindstrom | 4/DIG. 12 |
| 6,223,687 B1 | * 5/2001 | Windle | 119/6.7 |

* cited by examiner

Primary Examiner—Robert M. Fetsuga
(74) Attorney, Agent, or Firm—Dennison, Schultz & Dougherty

(57) ABSTRACT

The invention relates to a composting toilet installation comprising: a toilet seat placed over a gravity outlet opening; receiver means for receiving liquid effluent, fecal matter, and other waste; recovery means for receiving the liquid effluent; and displacement means for moving the fecal matter and other waste from the reception zone towards a storage zone. The installation further comprises in the storage zone: a composting medium constituted in particular by the fecal matter and other waste brought in by the displacement means and containing worms of a variety suitable for transforming the fecal matter and other waste into compost; and dampening means for keeping the composting medium damp other than by means of urine.

18 Claims, 3 Drawing Sheets

TOILET INSTALLATION IMPLEMENTING COMPOSTING WITH WORMS

The present invention relates to the general technical field of means for sanitation, removal, and transformation of human fecal matter and urine.

More particularly, the invention relates to dry toilets implementing composting with worms.

BACKGROUND OF THE INVENTION

Apart from solutions relying on electrical combustion or chemical degradation, various types of composting toilet are known in the state of the art. For example, U.S. Pat. No. 4,254,515 discloses a device comprising a toilet seat placed over a gravity outlet opening leading to means for collecting both liquid effluent and solid waste such as fecal matter and toilet paper. The collecting means is constituted by an endless belt arranged to confine a fraction of the liquid effluent. The belt is adapted to separate the solid waste from excess liquid effluent which is recovered in an appropriate treatment station. The endless belt is caused to move so as to transfer the solid waste to a treatment station that feeds a treatment substance for mixing in with the solid waste in a storage vessel maintained at a given temperature.

The proposed treatment of the fecal matter requires an auxiliary treatment substance to be supplied and it leads to a final product presenting volume and weight that are large relative to the solid waste to be treated.

Another composting technique, which is used in particular for treating sewage, consists in using worms of a suitable variety as an agent for airing the mass that is to be transformed into compost. Microorganisms in the digestive tubes of the worms act to accelerate the transformation of the sewage into compost.

Various problems arise in adapting that technique to composting toilets. Firstly, it is found that worms are sensitive to certain substances contained in urea, and in particular to the ammonia that results from transforming urea. Furthermore, worms can survive only in a medium that is damp.

OBJECTS AND SUMMARY OF THE INVENTION

The objects of the invention is thus to remedy those problems by proposing a toilet installation adapted to using worms for transforming fecal matter.

To achieve the above objects, the toilet installation of the invention comprises:

a toilet seat placed over a gravity outlet opening;

receiver means for receiving liquid effluent, fecal matter, and other waste, the receiver means being placed beneath the outlet opening and serving to separate the liquid effluent from the fecal matter and other waste;

recovery means for recovering the liquid effluent; and displacement means for displacing the fecal matter and other waste away from the reception zone situated beneath the outlet opening towards a storage zone and actuated by control means.

According to the invention, the toilet installation further comprises, in the storage zone:

a composting medium constituted in particular by fecal matter and other waste brought in by the displacement means, and containing worms of a variety suitable for transforming the fecal matter and other waste into compost; and dampening means for ensuring that the composting medium remains damp, other than by means of urine.

BRIEF DESCRIPTION OF THE DRAWINGS

Various other characteristics appear from the following description made with reference to the accompanying drawings which show embodiments and implementations of the invention as non-limiting examples.

MORE DETAILED DESCRIPTION

Figure 1:
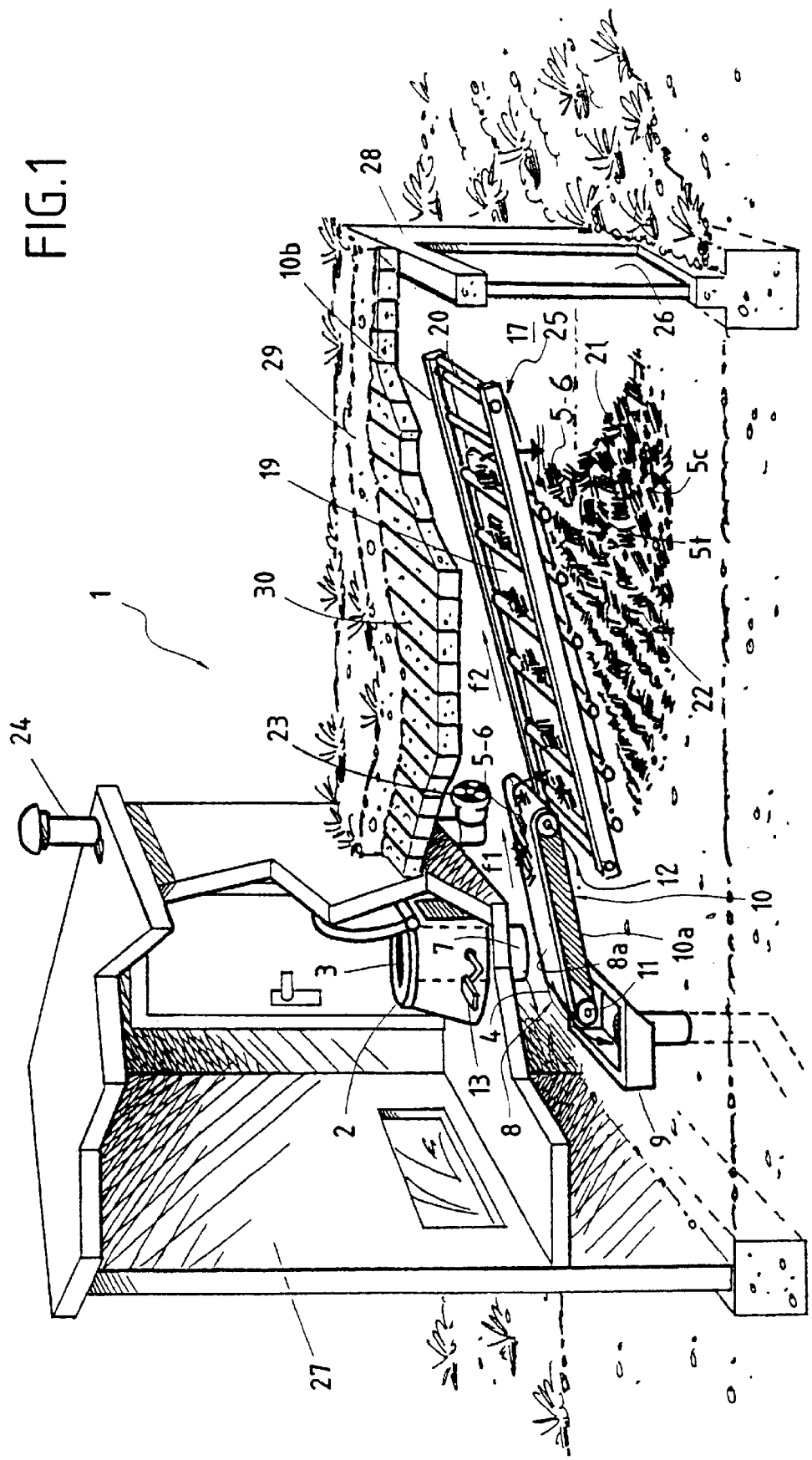
FIG. 1 is a diagrammatic perspective view showing an example of a toilet installation in accordance with the invention.

As can be seen more clearly from FIG. 1, the toilet installation 1 of the invention includes a seat 2 defining a gravity outlet opening 3 both for liquid effluent 4 such as urine, and fecal matter 5 and other waste 6 made up essentially of toilet paper, but also including cigarette ends or sanitary towels.

By way of example, the gravity outlet opening 3 can be extended by a downpipe 7 which is quasi-cylindrical and of large diameter, e.g. in the range 20 centimeters (cm) to 30 cm.

The outlet opening 3 is placed vertically above receiver means 8 for receiving the liquid effluent 4, the fecal matter 5, and the other waste 6. In the embodiment shown in FIG. 1, the receiver means 8 is constituted by a sloping surface 8a arranged to ensure complete gravitational separation between the liquid effluent 4 and the fecal matter 5 together with the other waste 6. The receiver surface slopes at an angle $\alpha$ lying in the range a few degrees to a few tens of degrees, and preferably lying in the range 5° to 30°. The sloping surface thus serves to separate the liquid effluent 4 which flows into a reception zone situated beneath the outlet opening 3 near the bottom end of the sloping surface so as to fall subsequently under gravity into a recovery vessel 9 placed substantially beneath the bottom end of the sloping surface 8a.

In another embodiment, the receiver means 8 can be constituted by a horizontal surface provided with through passages, such as a fine grid for example, allowing the liquid effluent 4 to filter through while retaining the fecal matter 5 together with the other waste 6.

Figure 2:
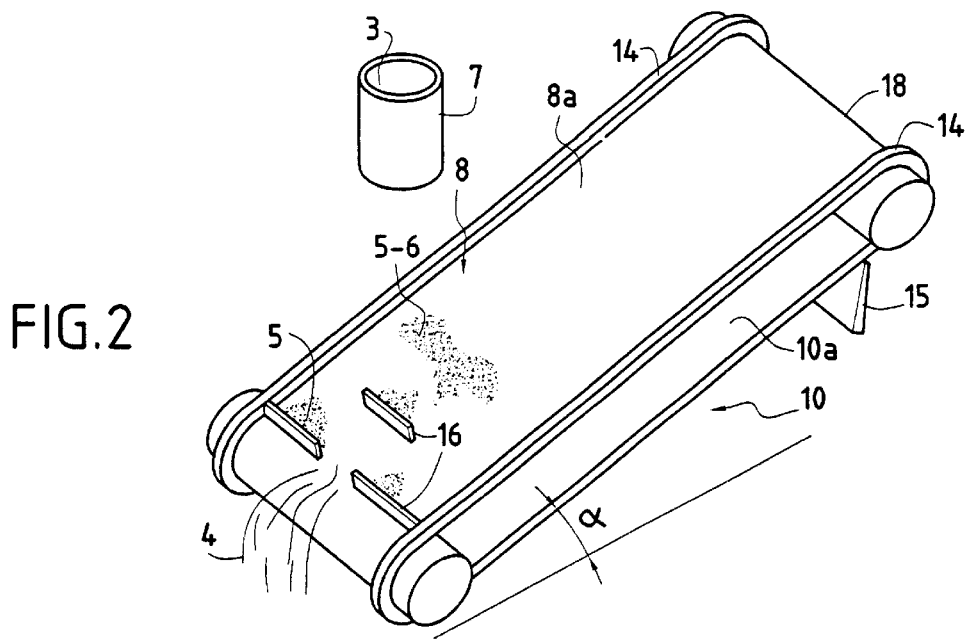
FIG. 2 is a detail perspective view showing a variant embodiment of the displacement means.

In the embodiment shown more particularly in FIGS. 1 and 2, the sloping surface 8a forms part of displacement means 10 constituted by a conveyor belt 10a. The conveyor belt comprises an endless strip mounted between two rollers 11 and 12. One of the rollers is designed to be rotated so as to move the conveyor belt in an upward direction $f_1$ towards the top of the belt 10a; The conveyor belt 10a is moved with the help of control means 13 such as a mechanical control actuated by a pedal after each use of the toilet.

In a first embodiment, the control means 13 is designed to provide "fast" advance of the belt 10a so that the fecal matter 5 and other waste 6 is not wet by liquid effluent coming from subsequent users. For example, the conveyor belt 10a is moved after each use through a distance which is sufficient to place the already-collected fecal matter and other waste away from vertically below the opening 3. In this variant, the fecal matter and other waste reaches the top of the belt after only a few uses, e.g. about four to six.

In a second embodiment, the control means 13 is arranged to provide "slow" advance of the belt 10a. In this embodiment, the belt 10a is advanced in such a manner that the fecal matter 5 and other waste 6 can be wet again by liquid effluent 4 coming from subsequent users using the opening 3. This serves to avoid any risk of fire, particularly when a still-lighted cigarette is thrown into the outlet opening 3. For example, the toilet paper and fecal matter can reach the top of the belt after about ten uses.

In a variant embodiment shown in FIG. 2, the conveyor belt is provided with anti-overspill edges 14 to prevent liquid effluent flowing off sideways. In a variant that is not shown, these edges can also rub against fixed vertical flaps secured to a tunnel situated in front of the outlet opening 3 and covering the conveyor belt so as to contain any splashes of liquid effluent.

In the bottom portion of its top end 18 the conveyor belt 10a can have a scraper 15 as shown in FIG. 2. The scraper 15 situated on the path of the belt serves to detach any fecal matter or other waste that remains stuck to the belt and thus serves to clean the belt coarsely.

Fixed baffles 16 can also be provided situated over the top surface of the bottom end of the conveyor belt 10a with the belt 10a traveling beneath them. The baffles 16 serve to prevent fecal matter rolling or sliding down the belt, while still allowing liquid effluent to pass round them. Once fecal matter has been stopped by the baffles 16, it sticks together and is subsequently moved upwards by the conveyor belt.

After each use of the toilet, the conveyor belt 10a is moved in the direction of arrow $f_1$ by the control means 13, thereby transporting the fecal matter and other waste upwards towards the top of the belt. On reaching the top end of the belt, the fecal matter and other waste is dropped under gravity either directly into a storage zone 17 or onto other displacement means 10b situated beneath the top end of the conveyor belt 10a, as shown in FIG. 1.

In the embodiment shown in FIG. 1, this second or "additional" displacement means is constituted by a scraper chain 10b traveling along and bearing against a sloping surface, e.g. in the form of a metal plate 19. The fixed surface 19 can also be horizontal. The scraper chain 10b comprises a series of scraper elements 20 each secured at each end to two endless chains mounted to pass over two rollers and to be moved in rotation. The scraper elements 20 can be small section tubes as shown or they can have any other appropriate shape such as being in the form of small flat scrapers. The fecal matter and other waste brought in by the conveyor belt 10a drops from the outlet thereof onto the plate 19.

The chains are designed to be rotated so as to move the scraper element 20 in an upward direction $f_2$ towards the top of the plate 19. The scraper chain 10b is moved using the control means 13 via a suitable transmission, well known to the person skilled in the art.

As a result, the fecal matter and other waste is pushed by the scraper elements towards the top end of the metal plate 19 from which it falls under gravity so as to form a composting medium 21 in the storage zone 17. This composting medium 21 contains worms 22 of a variety suitable for transforming the fecal matter and other waste into compost, for example worms of the species aesenia fetida.

The composting medium 21 is thus constituted by fecal matter 5 and other waste 6 recently brought in by the displacement means 10b, by the worms 22, by matter 5t that is being transformed, and by compost 5c.

In the embodiment of FIG. 1, the storage zone 17 is defined at least in part by the soil on which the composting medium 21 sands. The worms 22 can thus either be introduced into the composting medium 21 or they can arrive spontaneously from the soil.

In a preferred embodiment, the scraper chain 10b travels at a speed that is slower than the travel speed of the conveyor belt 10a. For example, when the belt 10a travels through a few centimeters, e.g. 2 cm to 3 cm, provision can be made to cause the scraper chain 10b to move through a few millimeters or a fraction of a millimeter, e.g. one-tenth of a millimeter.

The second or additional displacement means 10b thus serves to allow any traces of urine that remains impregnated in the fecal matter and other waste to be eliminated by evaporation. The installation can also include a ventilator member 23 situated above the plate 19. As can be seen in FIG. 1, the ventilator member 23 is mounted in a duct 24 leading to the outside, e.g. in the form of a chimney.

In the embodiment of FIG. 1, the scraper chain 10b also performs the function of spreader means 25 for spreading the composting medium 21 by causing the more recent fecal matter 5 and other waste 6 to move relative to the matter that has been transformed into compost 5c. The fecal matter 5 and other waste 6 drops into a pile in the storage zone 17 and contributes to forming the composing medium 21. Once the pile has reached a sufficient height, the scraper elements 20 situated on the bottom half of the scraper chain 10b act during their return movement to urge the most recent fecal matter towards the toilet seat 2. By spreading the compost medium, the device increases the stored quantity of fecal matter and compost. As can be seen from FIG. 1, an opening or access hatch 26 is provided at the end of the scraper chain 10b remote from the toilet seat 2 to give direct access to the oldest fecal matter and thus to the matter that is being transformed or that has already been transformed into compost.

Another variant (not shown) provides a temporary storage zone in the storage zone 17 in the immediate vicinity of the access hatch 26, with the composting medium being moved manually into said temporary storage zone at determined periods, e.g. once every five years prior to final removal.

Toilet installations of the invention are characterized by the presence of dampening means in the storage zone 17.

As a general rule, toilets of the invention are for installing in the wild at sites that are isolated or far from networks and power supplies. Dampening means using rainwater are therefore preferred over means using electric pumps.

As can be seen in FIG. 1, the toilet seat 2 is situated in a shed 27 and the storage zone 17 is in a tunnel 28 having a top portion 29 provided with passages 30 to allow rainwater to pass through so as to re-dampen the composting medium 21 each time it rains. By way of example, the passages 30 are in the form of small holes. The top portion of the tunnel can also be covered in soil so as to make it airtight. If the installation 1 constitutes an airtight enclosure, air is sucked continuously by the ventilator 23 specifically through the outlet opening 3 so as to avoid any bad smells in the shed 27, with the air inside the tunnel being renewed by sucking air in through the shed via the toilet seat.

In a particular embodiment, provision can be made for the tunnel 28 to have means for regulating the quantity of rainwater that falls onto the composting medium 21 so as to avoid soaking the composting medium during heavy rain. It is preferable to avoid excess rainwater penetrating into the ground after becoming contaminated in contact with fecal matter, thereby contaminating ground water.

Figure 5:
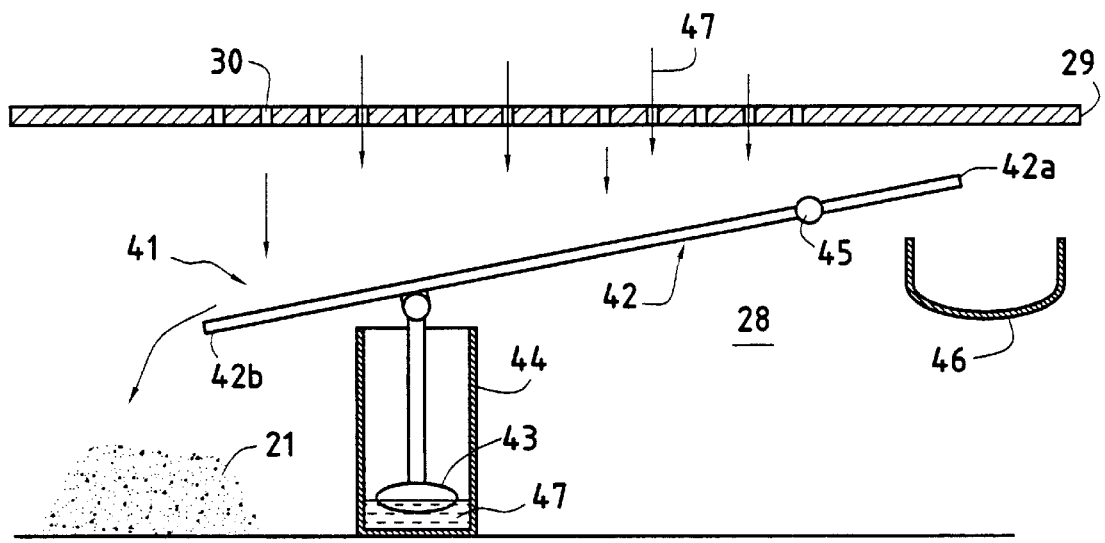
FIG. 5 is a section view of a variant embodiment including means for regulating rain water.
Figure 5:
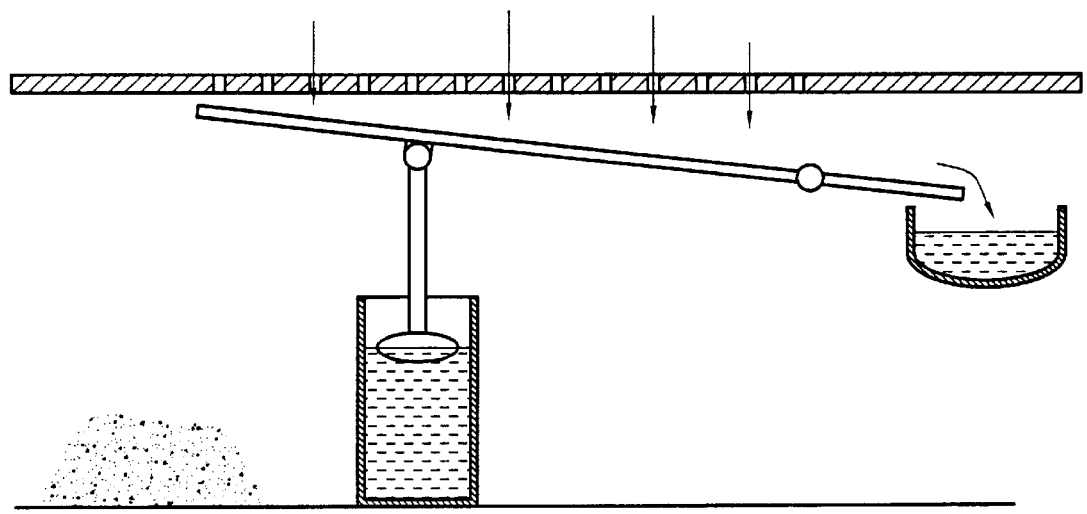

A variant embodiment enabling the quantity of rainwater that falls onto the composting medium to be controlled is shown in FIG. 5. The regulator means 41 for regulating rainwater 47 is placed in the storage zone 17 beneath the top portion 29 of the tunnel having the through passages 30, and it is constituted by a plate 42 having holes that allow rainwater to pass through, which plate 42 is hinged towards one end 42a situated above a discharge gutter 46 about a fixed horizontal shaft 45, and it is supported towards its opposite end 42b which is situated above the composting medium 21 by one or more floats 43 placed in a storage tank 44 so that when the tank 44 is empty the plate 42 slopes towards the composting medium 21. Thus, during heavy rain, the rain 47 falling through the passages 30 onto the plate 42 flows along the plate 42 and drops onto the composting medium 21, thereby re-dampening it, and simultaneously the rain 47 passes through the plate and fills the tank 44 containing the float 43. When the level of the water in the tank 44 rises, the float 43 also rises and thus tilts the plate towards the discharge gutter 46 so that the rainwater then goes to the gutter, thereby ensuring that the composting medium 21 does not become soaked. In dry weather, the water in the tank 44 evaporates, and the float 43 moves down, thereby returning the plate 42 so that it tilts towards the composting medium 21.

In dry weather, provision can also be made for the water contained in the storage tank 44 to be transferred slowly into the composting medium 21, e.g. by means of capillary textiles, thereby serving to re-dampen the composting medium 21.

In a variant that is not shown, water falling during heavy rain can be stored, for example by using a fixed plate or a tarpaulin disposed between the top portion 29 of the tunnel and the scraper chain 10b, and directed towards a storage tank so that the rainwater falling on this plate or tarpaulin is directed towards the storage tank. Such a device also serves to protect the additional displacement means 10b and thus avoid dampening fecal matter and other waste that is still on the sloping surface 19.

Figure 3:
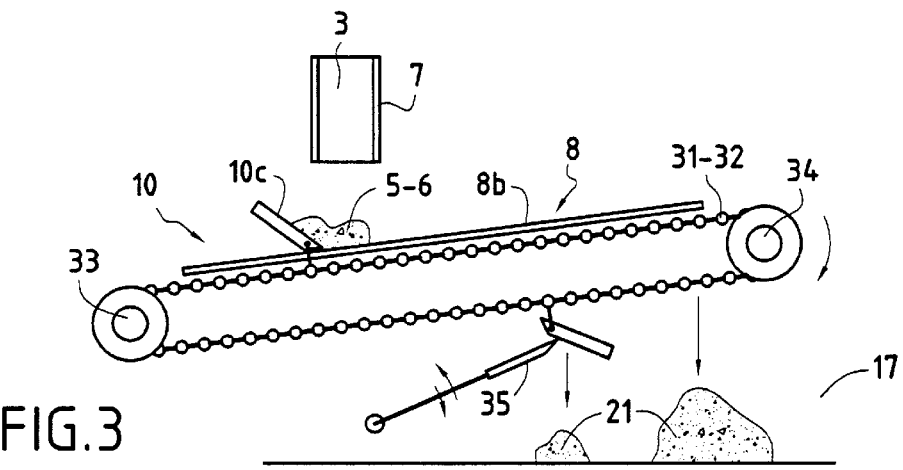
FIG. 3 is a detail section view showing another variant embodiment of the displacement means of the invention.

In the above example, the displacement means situated beneath the outlet opening 3, referred to as "first" displacement means, is constituted by a conveyor belt 10a. As can be seen in FIG. 3, this displacement means can be implemented differently, for example by means of a moving scraper 10c mounted on a sloping surface, e.g. constituted by a metal plate 8b. Insofar as there is no thorough sealing between the scraper elements and the sloping surface, the interstices that are left in this way allow urine to flow downwards, thereby achieving the desired separation.

Fecal matter 5 and other waste 6 is moved by means of at least one moving scraper 10c extending over the stationary sloping surface 8b. Each end of the moving scraper 10c is carried by a respective endless chain 31, 32 mounted between two rollers 33, 34 and caused to rotate by the control means 13. The moving scraper can be moved in fast mode or slow mode as defined above.

In another variant, the first displacement means can be constituted by a scraper chain comprising a series of scraper elements as described above.

To prevent fecal matter and other waste remaining stuck to the scraper element(s), provision can be made as shown in FIG. 3 for:

the scraper element(s) to slope in the opposite direction to the sloping surface; and a hinged scraper 35 urged resiliently to press against the scraper element(s) during return travel so as to scrape the scraper element(s).

The scraper 35 is urged resiliently by means of a spring or a counterweight, for example.

The displacement means, i.e. the conveyor belt 10a, the scraper chain 10b, or the moving scraper 10c can be used equally well of their own or in combination, directly at the outlet opening 3 or as additional means.

Figure 4:
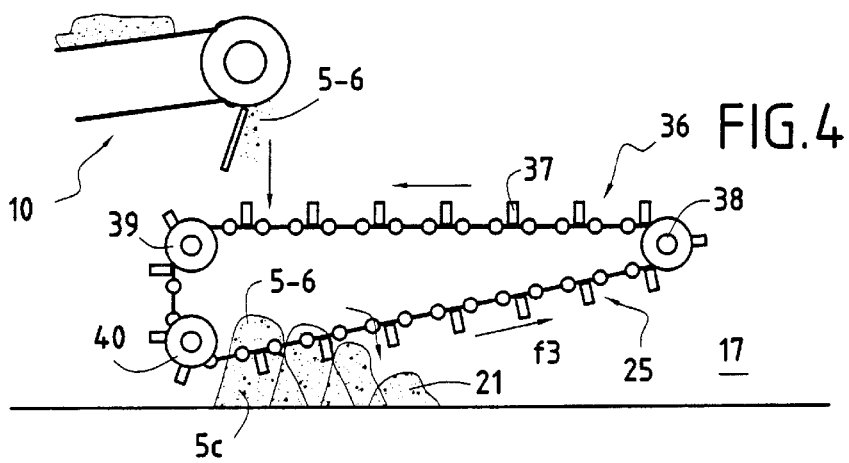
FIG. 4 is a section view of a variant embodiment further including spreader means.

Similarly, provision can be made to install independent spreader means 25 at the outlet from the displacement means. In the variant shown in FIG. 4, the spreader means 25 comprise a scraper chain 36 through which fecal matter 5 and other waste 6 falls, at the outlet from the displacement means 10 so as to form a pile forming part of the composting medium 21 in the storage zone.

The scraper chain 36 comprises scraper elements 37, e.g. in the form of small section tubes or of scrapers, each carried at both ends by two endless chains mounted to travel over three rollers (38, 39, 40) which are caused to rotate and which ensure that the bottom portion of the chain slopes.

As a result, there is a sufficient suitable distance between the two rollers 39 and 40 at the end of the scraper chain 36 situated close to the displacement means 10. Thus, when the pile of fecal matter brought in by the displacement means 10 grows, it passes through the bottom portion of the scraper chain 36. The rollers are designed to be rotated so as to move the chain in the upward direction $f_3$. This displacement is driven by the control means 13 via a suitable transmission so as to cause the chain to advance extremely slowly, a few tens or a few hundreds of microns per use of the toilet.

Thus, the most recent fecal matter and other waste on the sloping bottom portion of the scraper chain 36 is pushed towards the end of the chain remote from the toilet seat 2 so as to drop finally into the storage zone 17. This ensures that the composting medium is spread out and makes access via the hatch 26 easier, given the slope of the bottom portion of the scraper chain 36.

In a variant that is not shown, the installation 1 includes a mesh placed in the soil defining the bottom of the composting medium 21, with the mesh size being appropriate for allowing worms 22 to pass through while preventing access to the composting medium 21 by mammals such as moles.

It will readily be understood that the mesh size must be large enough to pass the worms that make composting possible, while being small enough to prevent moles from passing through. By way of example, the mesh can be in the form of a netting preferably made of a material that withstands corrosion, such as stainless steel.

What is claimed is:

1. A composting toilet installation comprising:
    a toilet seat placed over a gravity outlet opening;
    receiver means for receiving liquid effluent, fecal matter, and other waste, the receiver means being placed beneath the outlet opening and serving to separate the liquid effluent from the fecal matter and other waste;
    recovery means for recovering the liquid effluent; and
    displacement means for displacing the fecal matter and other waste away from the reception zone situated beneath the outlet opening towards a storage zone and actuated by control means;
    the installation further comprising, in the storage zone:
    a composting medium constituted in particular by fecal matter and other waste brought in by the displacement means, and containing worms of a variety suitable for transforming the fecal matter and other waste into compost; and dampening means for ensuring that the composting medium remains damp, other than by means of urine.

2. An installation according to claim 1, wherein the storage zone is defined, at least in part, by the soil on which the composting medium stands.

3. An installation according to claim 2, wherein a mesh is placed in the soil defining the composting medium, the mesh size being suitable for allowing worms to pass through and for preventing access to the composing medium by mammals such as moles.

4. An installation according to claim 1, including, in the storage zone, spreader means for spreading the composting medium so as to cause the more recent fecal matter and other waste to move relative to the matter that has been transformed into compost.

5. An installation according to claim 4, wherein the spreader means is constituted by a sloping scraper chain with the scraper elements that are situated in the bottom half of the scraper chain acting during their return movement to urge the more recent fecal matter towards the toilet seat.

6. An installation according to claim 4, wherein the spreader means is constituted by a scraper chain with the fecal matter and other waste falling through the chain so that the sloping bottom portion of the chain urges the more recent fecal matter away from the toilet seat.

7. An installation according to claim 1, wherein the storage zone is in a tunnel whose top portion is provided with through passages for passing rainwater, thereby dampening the composting medium.

8. An installation according to claim 7, wherein the tunnel includes regulator means for regulating the quantity of rainwater that falls onto the composting medium.

9. An installation according to claim 8, wherein the regulator means is constituted by a plate provided with holes that allow rainwater to pass through, the plate being hinged towards an end situated above a discharge gutter on a fixed horizontal shaft and being supported towards its opposite end situated above the composting medium by one or more floats placed in a storage tank, such that when the tank is empty, the plate slopes towards the composting medium.

10. An installation according to claim 1, wherein the receiver means is constituted by a sloping surface serving to separate the liquid effluent completely from the fecal matter and other waste by means of gravity.

11. An installation according to claim 10, wherein the sloping surface constitutes a portion of the displacement means implemented by a conveyor belt.

12. An installation according to claim 11, wherein the conveyor belt is provided with anti-overspill edges.

13. An installation according to claim 11, wherein the top portion at the bottom end of the conveyor belt travels under stationary baffles that allow liquid effluent to pass sideways.

14. An installation according to claim 11, wherein the bottom portion at the top end of the conveyor belt includes a scraper for unsticking fecal matter and other waste that has stuck to the belt.

15. An installation according to claim 10, wherein the sloping surface is provided with displacement means constituted by a moving scraper element or by a scraper chain, comprising a series of scraper elements for entraining fecal matter and other waste towards the storage zone.

16. An installation according to claim 15, wherein:
the scraper element(s) slope(s) in the opposite direction to the sloping surface; and
a hinged scraper is urged resiliently so as to press against the scraper element(s) during return movement so as to scrape said scraper element(s).

17. An installation according to claim 10, including another displacement means situated substantially vertically below the top end of the inclined surface, said other displacement means being constituted by a sloping surface on which a scraper chain travels.

18. An installation according to claim 17, wherein the scraper chain travels at a speed that is slower than the travel speed of the conveyor belt so as to allow any traces of urine that might remain impregnated in the fecal matter and other waste to be eliminated by evaporation.

* * * * *